(12) United States Patent
Hart et al.

(10) Patent No.: US 9,472,939 B1
(45) Date of Patent: Oct. 18, 2016

(54) REMOTE DISPLAY

(75) Inventors: Gregory M. Hart, Mercer Island, WA (US); Jeffrey P. Bezos, Greater Seattle Area, WA (US)

(73) Assignee: Amazon Technologies, Inc., Reno, NV (US)

(*) Notice: Subject to any disclaimer, the term of this patent is extended or adjusted under 35 U.S.C. 154(b) by 446 days.

(21) Appl. No.: 12/716,214

(22) Filed: Mar. 2, 2010

Related U.S. Application Data

(60) Provisional application No. 61/292,465, filed on Jan. 5, 2010.

(51) Int. Cl.
| | |
|---|---|
| *H04B 5/00* | (2006.01) |
| *G09G 5/00* | (2006.01) |
| *H02J 17/00* | (2006.01) |
| *H02G 11/00* | (2006.01) |
| *H04B 7/00* | (2006.01) |

(52) U.S. Cl.
CPC ............... *H02G 11/00* (2013.01); *H04B 7/00* (2013.01)

(58) Field of Classification Search
CPC ............ G09G 5/00; H02J 17/00; H02J 7/00; H04B 5/00; H04B 7/00; H04B 7/14; H04J 3/00; H04J 3/08; H04J 1/00; H04J 1/10; H01F 38/00; H01F 38/14; H04W 4/00; H04W 4/14; H04W 28/00; G06F 3/00; G06F 15/00; G06F 15/16; G06F 17/00; G06F 17/30
USPC .................................................. 345/1.1–3.4
See application file for complete search history.

(56) References Cited

U.S. PATENT DOCUMENTS

| | | | | |
|---|---|---|---|---|
| 5,136,695 | A  * | 8/1992  | Goldshlag et al. | 345/2.1 |
| 5,647,554 | A  * | 7/1997  | Ikegami et al. | 242/390.9 |
| 7,936,079 | B2 * | 5/2011  | Rees et al. | 290/55 |
| 2001/0045003 | A1 * | 11/2001 | Dondiz et al. | 29/593 |
| 2001/0046850 | A1 * | 11/2001 | Blanke et al. | 455/411 |
| 2003/0051182 | A1 * | 3/2003  | Tsirkel et al. | 713/320 |
| 2003/0128197 | A1 * | 7/2003  | Turner et al. | 345/204 |
| 2003/0209397 | A1 * | 11/2003 | Reindle et al. | 191/12.2 R |
| 2004/0160342 | A1 * | 8/2004  | Curley et al. | 340/995.1 |
| 2004/0222983 | A1 * | 11/2004 | Kakemura | 345/204 |
| 2006/0094432 | A1 | 5/2006  | Chang et al. | |
| 2006/0184705 | A1 * | 8/2006  | Nakajima | 710/303 |
| 2006/0203758 | A1 * | 9/2006  | Tee et al. | 370/315 |
| 2007/0021140 | A1 * | 1/2007  | Keyes et al. | 455/522 |
| 2007/0198634 | A1 | 8/2007  | Knowles et al. | |
| 2008/0055191 | A1 * | 3/2008  | Craig et al. | 345/2.2 |
| 2008/0186210 | A1 | 8/2008  | Tseng | |
| 2009/0039828 | A1 * | 2/2009  | Jakubowski | 320/106 |
| 2009/0098894 | A1 * | 4/2009  | Dudley et al. | 455/466 |

(Continued)

OTHER PUBLICATIONS

"Non Final Office Action dated Apr. 30, 2013", U.S. Appl. No. 13/621,103, Apr. 30, 2013, 52 pages.

(Continued)

*Primary Examiner* — Ilana Spar
*Assistant Examiner* — Nguyen H Truong
(74) *Attorney, Agent, or Firm* — Polsinelli LLP

(57) ABSTRACT

A remote display system including a portable display that wirelessly receives data and power from a primary station. The primary station, which is remote from and without a tangible connection with the portable display, includes a data transmitting element and a power transmitting element. The portable display includes a power receiving element that receives power wirelessly from the power transmitting element and a data receiving element operable to receive data from the data transmitting element.

41 Claims, 8 Drawing Sheets

(56) References Cited

U.S. PATENT DOCUMENTS

| | | | |
|---|---|---|---|
| 2009/0146779 A1* | 6/2009 | Kumar et al. | 340/5.31 |
| 2009/0160261 A1* | 6/2009 | Elo | 307/104 |
| 2009/0247167 A1 | 10/2009 | Higashide | |
| 2009/0248793 A1* | 10/2009 | Jacobsson et al. | 709/203 |
| 2009/0264069 A1* | 10/2009 | Yamasuge | 455/41.1 |
| 2010/0156835 A1 | 6/2010 | Tamura | |
| 2010/0164296 A1* | 7/2010 | Kurs et al. | 307/104 |
| 2010/0329363 A1* | 12/2010 | Ng et al. | 375/257 |
| 2011/0140993 A1* | 6/2011 | Bess | 345/2.3 |
| 2012/0280765 A1 | 11/2012 | Kurs et al. | |

OTHER PUBLICATIONS

"Final Office Action dated Sep. 3, 2013", U.S. Appl. No. 13/621,103, 17 pages.

"Non-Final Office dated Apr. 30, 2013", U.S. Appl. No. 13/621,103, Apr. 30, 2013, 18 pages.

"Non-Final Office Action dated Jan. 27, 2014", U.S. Appl. No. 13/621,103, Jan. 27, 2014, 16 pages.

"Final Office Action dated May 9, 2014", U.S. Appl. No. 13/621,103, May 9, 2014, 18 pages.

\* cited by examiner

REMOTE DISPLAY

CROSS-REFERENCE TO RELATED APPLICATIONS

This application claims priority to U.S. Provisional Patent Application No. 61/292,465, filed Jan. 5, 2010, entitled "Remotely-Powered Electronic Devices," which is incorporated herein by reference in its entirety for all purposes.

BACKGROUND

An increasing number of portable electronic devices are being used for everyday purposes such as viewing movies, listening to audio, reading books, receiving directions and communicating with others. As such, users are seeking devices that are increasingly smaller and/or more lightweight. The ability to continue to reduce the form factor of many of today's devices is somewhat limited, however, as the devices typically include components such as processors and batteries that limit the minimum size and weight of the device. While the size of a battery is continuously getting smaller, the operational or functional time of these smaller batteries is often insufficient for many users. Once the battery charge is depleted, the batteries in a portable device must typically be recharged, which limits use of the portable device as it is connected to a fixed power source (e.g., power cord plugged into an electrical outlet, charger plugged into car). In addition to limiting the usage range, the charging cord is often messy in appearance.

DETAILED DESCRIPTION

The technology described herein is a remote display system that includes a portable display and a primary station. The primary station, which is remote from and not tangibly connected with the portable display, wirelessly transmits both data and power to the portable display. The portable display, by receiving power from the primary station, does not require an independent power source in order to present content received from the primary station. The ability for a portable display to present content to a user with a reduced number of components may result in a reduced size and weight of the portable display and may eliminate a need to periodically recharge the portable display.

Figure 1:
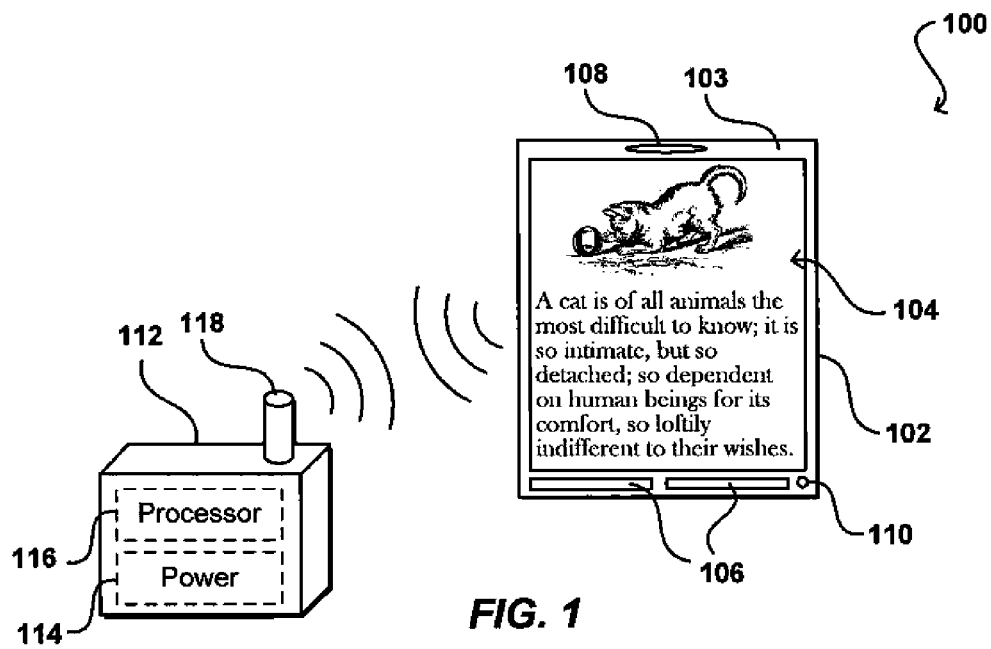
FIG. 1 illustrates an embodiment of a remote display system that includes a portable display and a primary station.

FIG. 1 illustrates one example of a remote display system 100 that includes portable display 102 and primary station 112. Portable display 102, in some embodiments, includes a housing 103 that encases a display screen 104. Housing 103 may include, but is not limited to, one or more buttons 106, an audio/video input 108 (e.g., camera, microphone) and an indicator 110 (e.g., power or status indicator). For example, portable display 102 may include buttons 106 to move to the next or previous page of content, a power button and the like. Housing 103 may include any other appropriate components necessary for navigating through content displayed on the screen 104, as known or subsequently developed for such purposes.

To illustrate a specific example, a user may consume content utilizing remote display system 100 having a portable display 104 and a primary station 112. In addition to receiving power from primary station 112, portable display 104 receives content; both the content and power are received without a physical connection between station 112 and display 104. The content is displayed or presented to the user via portable display 104. As the user consumes the content, additional material/content is displayed on portable display 104. Portable display 104 does not require an internal power supply (e.g., a battery), as power is wirelessly received from the primary station 112. As a result, the portable display 104 may operate for longer periods of time and weigh less, thus improving the user's reading experience. In addition, the user could consume the content on portable display 104 without being concerned about recharging or replacing an internal battery.

Display screen 104 presents the content transmitted from primary station 112. Display screen 104 may be an electrophoretic display, cholesteric display, liquid crystal display (LCD), light emitting diode (LED) display, as well as a combination of one or more displays of one or more type known in the art. Display screen 104 may also be a touch-sensitive screen, which may be in addition to, or eliminate the need for, one or more buttons 106. Portable display 102 is not required to have any buttons 106, a/v input 108 or indicator 110.

FIG. 1 illustrates that, in some embodiments, primary station 112 includes power source 114, processor 116 and antenna 118. By way of example only, power source 114 may comprise an electrical power cord that plugs into an electrical outlet, a battery or any other combination of power components known in the art that may be used to provide power to the components. Processor 116 may include one or more processors, graphics processors, memory, etc. Antenna 118 wirelessly delivers content to portable display 102. One skilled in the art understands that antenna 118 is not required for primary station 112 to wirelessly transmit power or data to a portable display 102.

Primary station 112 wirelessly communicates both data and power to portable display 102. One or more wireless signals can be transmitted from primary station 112 to provide data and power to portable display 102. In some embodiments, primary station 112 transmits power to portable display 102 using the same wireless signal that is used to transmit data. In other embodiments, primary station 112 wirelessly transmits power to portable display 102 using a different wireless signal than the signal(s) used to transmit data to the portable display 102.

Figure 2:
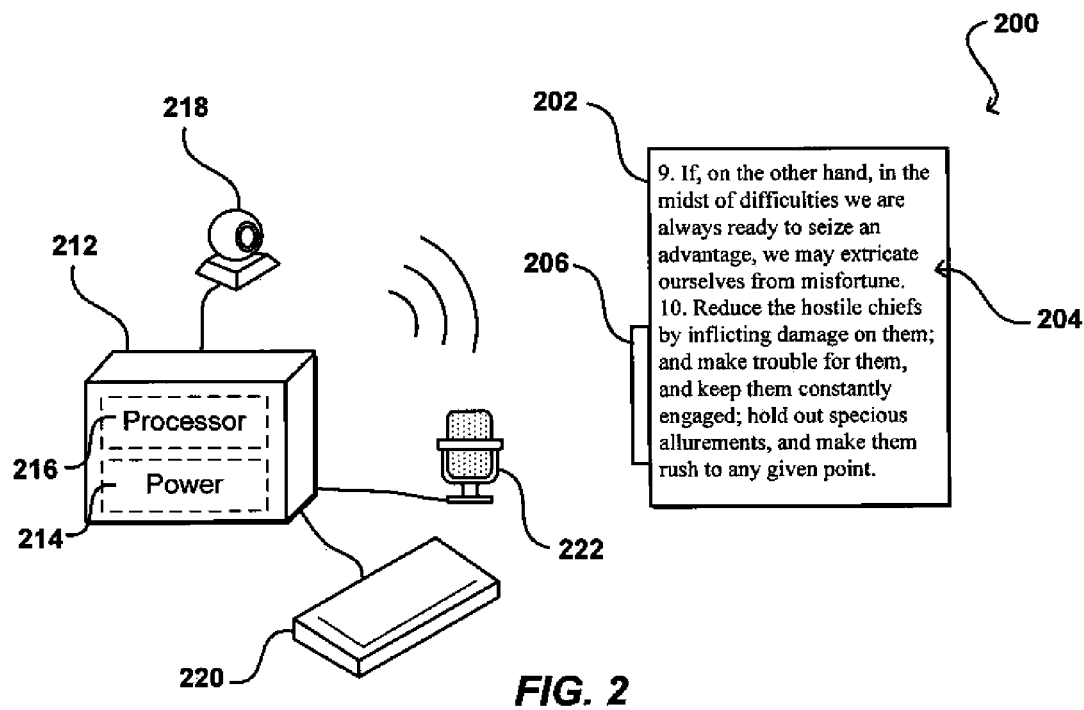
FIG. 2 illustrates another embodiment of a remote display system that includes a portable display and a primary station.

FIG. 2 illustrates remote display system 200 wherein some of the functionality of portable display 102 shown in FIG. 1 has been removed to further reduce the weight, size and/or power consumption of the portable display 102. In FIG. 2, portable display 202 substantially only includes a display screen 204. The portable display 202 shown in FIG. 2 has a circuitry housing portion 206 that may be removably attached to display screen 204. Housing 206 is shown in FIG. 2 attached to a side of the portable display 202. However, housing 206 may be located in other positions relative to the screen as well. For example, housing 206 may be removably attached to a backside of the portable display 202 whereby only the housing portion 206 is potentially thicker than the display screen. A housing 206 that is removably attached to display screen 204 would allow a user to replace only the screen 204 or housing 206 without having to replace the entire portable display.

Housing 206, in some embodiments, contains power receiving circuitry and data receiving circuitry configured to receive the power and data provided by primary station 212 as part of the same or separate wireless signals. Housing 206 may also include display circuitry for rendering the content received from primary station 212 for display in the display screen 204. In some embodiments, the circuitry mentioned above may be contained within the display screen 204 itself, or attached thereto, such that a separate housing 206 is not necessary.

In FIG. 2, portable display 202 does not include any user input mechanisms, as user input mechanisms are provided in primary station 212. As shown in FIG. 2, primary station 212 can include a power source 214, a processor 216, imaging detection element 218, a keyboard 220 and/or a microphone 222. Primary station 212 may also include other input mechanisms such as a mouse or tablet, so that the user can provide input to the primary station, and the resulting output (if any) can be transmitted to the portable display.

Microphone 222 may enable a user to provide audio commands to the primary station 212. For example, a user may issue audio commands to the primary station 212, which transmits the command to the portable display 202. In an instance where the portable display 202 is a smart phone displaying text content, a user viewing a page on the portable display 202 can issue an audio command such as "next" or "flip," which, when received by the microphone 222, delivers a signal to the portable display 202 so that the next page of the content is displayed. In some embodiments, the signal transmitted by primary station 212 to the portable display 202 to present the next page may include a command for the portable display 202 to render the next page of content. In other embodiments, the signal transmitted by primary station 212 may include a pre-rendered image of the next page of the electronic book. Microphone 222 can be a wirelessly powered microphone, which can be worn or otherwise remotely positioned by the user. A wireless microphone 222 may communicate with the primary station using any communication protocol known in the art (e.g., BLUETOOTH®, radio frequency (rf)).

Detection element 218 may include any appropriate component or combination of components such as may be used to transmit and/or receive radiation for detecting motion, position or any other such information. In some embodiments, the detection element 218 is a camera that is able to detect objects, motion and/or movement of the user via ambient light. For example, while reading a book on the portable display 202, a user could pass a hand over display 204 of portable display 202 in a right-to-left motion (or other configuration as defined by the user). A camera would detect this motion, the primary station 212 would interpret the motion as intent by the user to move to the next page in the book and the primary station 212 would transmit a data signal to the portable display 202 to display the next page in the book. The user could perform any of a number of other motions to provide input, and that input could be correlated to any of a number of actions, such as to scroll content, zoom in or out, power off, etc. In some embodiments, detection element 218 can emit a signal, such as infrared radiation or ultrasound and detect the reflection of that signal to track aspects such as eye movement of the user to perform a function. The detected signal can be used to perform a function such as turning a page based on eye movement or turning the device off if the user's eyes are closed for a defined or selected period of time.

Detection element 218 may also be used to implement one or more security features of a portable display. A security feature may include a content limiting feature and/or a functionality feature. For example, if detection element 218 is a camera, detection element 218 may be able to detect who is holding a portable display or who is located within proximity of the portable display. In this instance, a user may want to limit the access and/or features available to the portable display based on who is holding the portable display or located nearby. By way of example only, a portable display may be configured such that only child appropriate content may be displayed or accessed when detection element detects that a child is holding the portable display or is located within the same room as the portable display.

Similarly, when a parent leaves the house without their portable display, the portable display may be accessed by their children while the parent is away. The parent may want to limit the functionality of the portable display so that their children cannot purchase new content, access inappropriate content and/or view private content (e.g., plans for child's surprise birthday party) while the parent is away. When detection element 218 detects that a child is operating the portable device, the safety feature limiting the functionality of the portable display is activated. Although FIG. 2 illustrates that each of the input mechanisms (e.g., detection element, microphone and keyboard) are attached to the primary station 212 via a wired connection, one of skill in the art understands that one or more of the input devices may be a wireless device.

Security features may also be activated based on feedback received from housing 103. For example, if housing 103 includes a touch-sensitive surface (e.g., capacitive sensing, resistive sensing), housing 103 may detect who is holding the portable display and/or whether the person holding the portable display is a minor. By way of example only, a touch-sensitive housing may determine that a minor is holding a portable display based on any combination of a width of the person's fingers, a length of the person's fingers and an area of the housing being gripped by the person's hand. Based on the information provided by the housing, the security feature may be enabled by the portable display (or primary station). Security features may prevent the portable display from functioning at all (e.g., portable display cannot be turned on), certain content may not be accessed and/or displayed (e.g., age inappropriate content) and/or certain functions of the portable display may be disabled (e.g., user cannot purchase new content).

Figure 3:
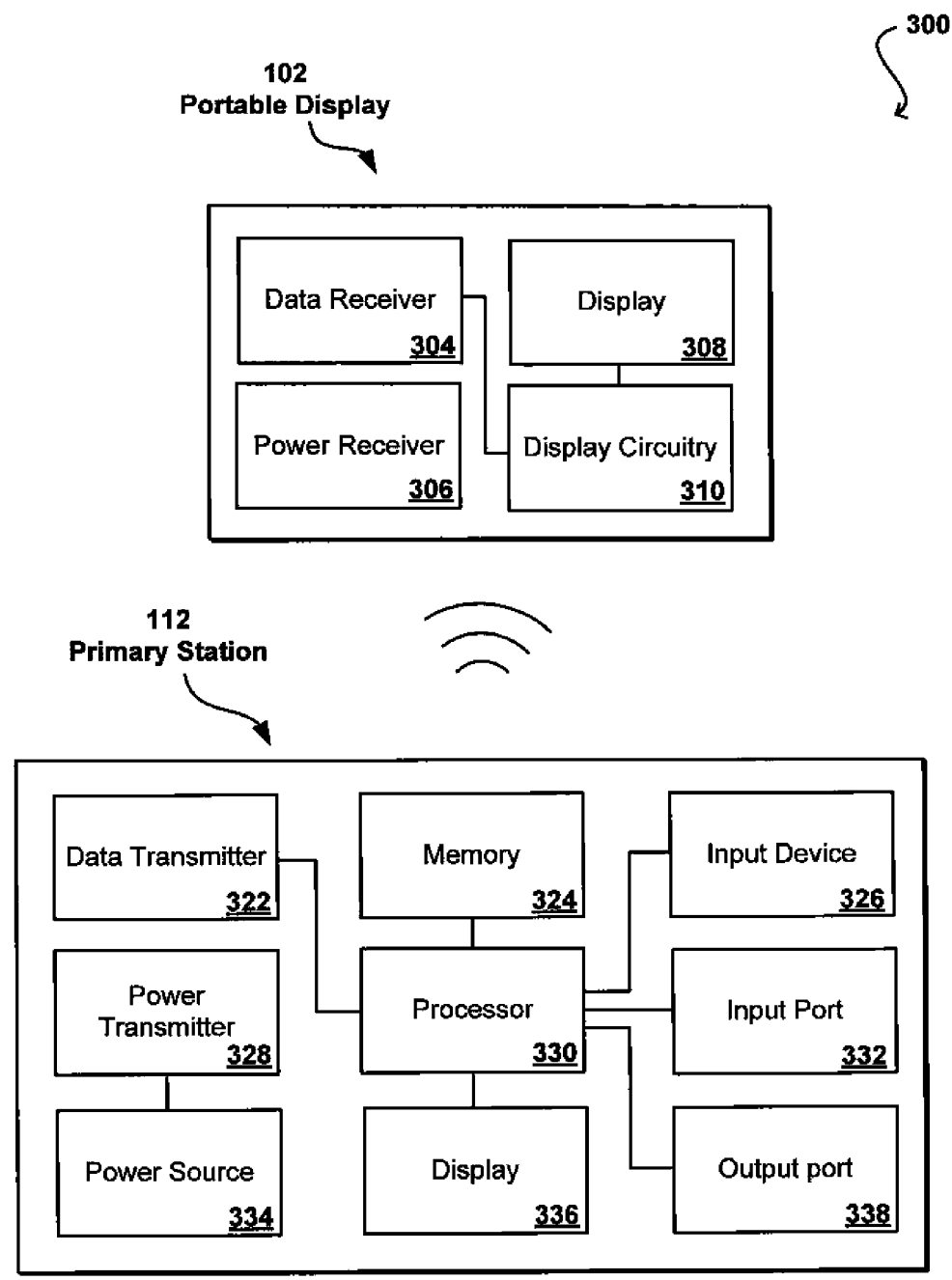
FIG. 3 is a block diagram of various components of a primary station and a portable display, according to various embodiments.

FIG. 3 illustrates various components of the portable display 102 (or 202) and the primary station 112 (or 212) shown in FIGS. 1 and 2. As should be understood, additional, fewer or alternative components can be used in similar or different configurations as would be apparent to one of ordinary skill in the art in light of the teachings and suggestions contained herein, and only certain components are illustrated for purposes of simplicity of explanation. For ease of description, only portable display 102 and primary station 112 are referenced with regard to FIG. 3; however the description also applies to portable display 202 and primary station 212.

In FIG. 3, portable display 102 includes a data receiver 304, a power receiver 306, a display 308 and a display circuitry 310. In some embodiments, data receiver 304 and power receiver 306 may be a single component. Data receiver 304 receives both content and control data transmitted by primary station 112 and communicates the content/control data to display circuitry 310. Power receiver 306 receives power transmitted from primary station 112 to power the other components contained within the portable display 102. Display circuitry 310 is configured to display content to a user via display 308. In addition to receiving signals, data receiver 304 may be a transceiver to both receive and send data.

FIG. 3 illustrates that primary station 112, in some embodiments, includes data transmitter 322, memory 324, input device 326, power transmitter 328, processor 330, input port 332, power source 334, display 336 and output port 338. Data transmitter 322 wirelessly transmits data (e.g., content, control signal) to portable display 102 using any communication protocol known in the art such as, but not limited to, BLUETOOTH®, Wi-Fi and radio frequency.

Power transmitter 328 wirelessly transmits power to portable display 102. Power transmitter 328 can obtain power from at least one power source 334. Power source 334 may be, by way of example only, a battery, a power supply connected via a power cord to an electrical outlet or any other appropriate power source. Any technology known in the art can be used to transmit power from primary station 112 to portable display 102. For example, power may be transferred wirelessly from primary station 112 to portable display 102 by near-field induction. In an inductive system, the primary station 112 and portable displays have one of the primary and secondary circuits (power transmitting and receiving mechanisms, respectively) of a transformer, and the energy transfer is performed via electromagnetic (inductive) coupling between the circuits. The power transmitter circuitry of the primary station 112 and the power receiving circuitry of the portable display 102 will typically have to be within a specified range of each other in order to transmit the necessary amount of power, as energy losses over distance can affect the transmission.

Where longer transmission distances are needed, processes such as electromagnetic induction can be used wherein a primary coil (i.e., the power transmitting mechanism) in the primary station 112 generates an electromagnetic field. As long as the secondary coil the power receiving mechanism) of the portable display 102 is within the electromagnetic field, a current can be induced in the secondary coil that provides power to the remote component. In other embodiments, capacitive energy transmission technologies can be used to deliver power from primary station 112 to portable display 102. Other approaches such as, but not limited to, electrostatic induction and electromagnetic resonant coupling can be used as well within the scope of the various embodiments.

Input device 326 may be, by way of example only, a keyboard, mouse and/or a set of buttons (e.g., power button). Display 336 may be any type of display known in the art, including, for example, a liquid crystal display (LCD) or series of LEDs. Input device 326 and/or display 336 may enable a user to interact directly with primary station 112. For example, utilizing the input device 326 and display 336 in the primary station 112 would enable a user to select an electronic book (e.g., from a menu or list) for viewing on portable display 102, turn the power on/off to portable display 102 or obtain new content from a network (e.g., download a new electronic book).

Data may be delivered to portable display 102 in various ways. In some embodiments, portable display 102 is configured to receive pre-rendered content (e.g., bitmap images including page content or other renderings of content) and provide the pre-rendered content via display 308. In the instance whereby the portable display 102 is an electronic book reader, as the portable display 102 receives pages of a book that are pre-rendered, display circuitry 310 causes the pre-rendered pages, received via data receiver 304, to be displayed on display screen 308. Although not shown, display circuitry 310 can include, or be connected to, components capable of storing multiple pages of a book at a time. Selecting the appropriate page to present in display 308 may be based on an input received via portable display 102 or from primary station 112.

In other embodiments, a portable display 102 may include components such as a processor and associated circuitry whereby the portable display 102 is able to receive code with embedded tags, for example, that could be rendered on the portable display. This approach transmits text instead of image data, which lessens the amount of data transmitted from the primary station 112 to the portable display 102 and accordingly, lessens the transmission times. Further, this method enables each portable display 102 to render the content according to the capabilities, preferences or settings of the component, such as the screen resolution and font size.

In an instance where a portable display 102 presents the contents of an electronic book (eBook) to the user, each page of the eBook may be associated with an identifier. The identifier can be used to determine subsequent pages or other content likely to be requested by the portable display 102. For example, if the user is viewing the first page of an electronic book on the portable display 102, it is likely that the user will eventually want to view the second page of the book. In embodiments where the portable display 102 has sufficient memory, the primary station 112 can determine the next one or more pages likely to be requested by the portable display 102 based at least in part upon the identifier. Further, the primary device 112 can transmit at least the second page to the portable display 102 while the user is reading the first page or otherwise before the portable display 102 requests the second page. In some embodiments, the content may only be transmitted to the portable display 102 when the portable display 102 requests the particular page, such as where there is limited available memory on the portable display 102. The ability to preload content on the portable display 102 may reduce the amount of time needed to transition between displayed pages.

In some embodiments, the portable display 102 can store other types of content as well. For example, when a user, reading an electronic book, navigates to the next page of the electronic book, the portable display 102 may store the prior page in memory, at least until a subsequent number of pages have been loaded and/or viewed, such that the user can turn back to the previous page(s) without the primary station 112 having to retransmit the page to the portable display 102. The number of pages stored before or after the current page can depend at least in part upon the amount of memory in the primary station 112 and/or portable display 102 and in some embodiments can be user-configurable. In some cases, entire chapters or books could be stored, or pre-loaded, onto the portable display 102. The number of stored pages may also depend on the amount of power received at the portable display 102. Similarly, the portable device may present many types of content including video, image, audio, text and the like.

In general, the portable display 102 may be configured to store pages or other content that is most likely to be viewed next on the device. For example, in addition to the previous and subsequent pages for the current book, the portable display 102 can store similar pages for other electronic books that the user is reading. Similarly, the portable display 102 may store other often-accessed pages such as a home page or user interface page where a user may select which book to view. In some embodiments, the user can have the ability to view available books on an interface page and select books to be purchased, downloaded or otherwise accessed. Various other types of content can be viewed as well, as should be apparent in light of the present discussion.

Primary station 112, while not shown in FIG. 3, may also include a graphics processing unit and other rendering components such that only minimal rendering circuitry (if any) is required in portable display 102 to render an image, audio, video and the like. Portable display 102 can include other components discussed herein, such as input mechanisms, memory and data transmitters. In some embodiments, portable display 102 can also include a power source (e.g., battery) that is recharged when the portable display 102 is within range of a primary station 112 and is only used to power portable display 102 when the portable display 102 is out of range of a primary station 112. This may be useful in the instance where a user moves to another room for a short period of time that is out of range of a primary station 112. A power source in portable display 102 would prevent portable display 102 from losing power when out of range of primary station 112. In some embodiments, the range of the transmitted power may be more or less than the range of transmitted content.

Figure 4:
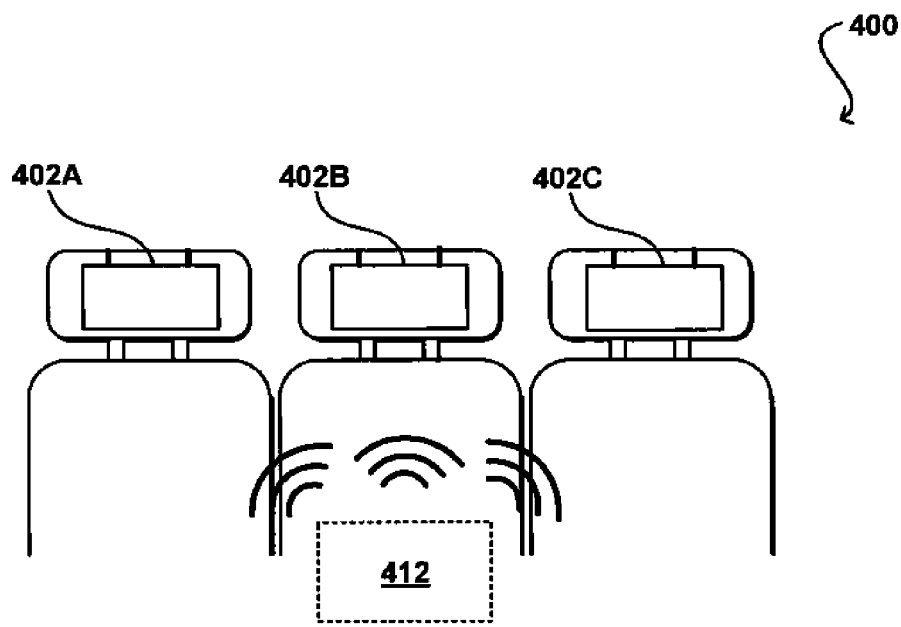
FIG. 4 illustrates multiple portable displays in communication with a single primary station.

FIG. 4 illustrates a configuration 400 of multiple portable displays (e.g., portable displays) 402A, 402B, 402C and a single primary station 412 located in a vehicle. In this example, multiple portable displays 402 operate with a single primary station 412. Known audio-video (a/v) systems currently used in vehicles to allow passengers to view video programs are bulky, use a/v wires to connect the DVD player to each monitor and require expensive installation. Unlike current a/v systems, configuration 400 allows one or more passengers in a vehicle to watch a DVD or video program while traveling in the vehicle without requiring any additional wiring between the primary station 412 and each portable display 402. In addition, configuration 400 allows additional passengers that enter the vehicle to watch a video program using their own portable display 402. Each portable display 402 may display unique content or the same content as the other portable display(s) 402.

A primary station 412 may be placed anywhere in the vehicle and may receive power from a 12V power source in the vehicle. For example, primary station 412 may be connected to a power outlet in the vehicle or hardwired to the vehicle's electrical system. Even though FIG. 4 illustrates a single primary station 412, one or more primary stations 412 may be installed or integrated into the vehicle. A portable display 402 can be located anywhere in the vehicle, such as held by a passenger or attached by a mounting element (e.g., straps, bands) to the back of headrests in the vehicle (as shown in FIG. 4). Because each portable display 402 receives data and power wirelessly from primary station 412, a user can view a DVD or other content while traveling in the vehicle without having to physically connect the portable display 402 to any power source.

In some embodiments, a portable display 402, operating in a sleep or stand-by mode, "wakes up" when the portable display 402 is located within the power transmitting range of the primary station 412. Once in a normal operating mode, the portable display 402 may begin to present the content being transmitted by the primary station 412. In other embodiments, when portable display 402, operating in the stand-by mode, enters the power transmitting range of a primary station 412, the portable display 402 prompts the user to "wake up" the device and will wait to present the content being transmitted by the primary station 412. Additionally, when portable device 402 "wakes up," the user can select or specify the content to be present on the portable display 402.

Primary station 412 may be configured to automatically detect the presence of a portable display 402 within the vehicle. For example, when a portable display 402 initially enters the power transmitting range of the primary station 412 and "wakes up," the portable display 402 may transmit a connection request to the primary station 412. Primary station 412 may begin to transmit a data signal to the portable display 402 based on whether the primary station 412 is a secure primary station 412 (e.g., requires a password or key to access) or an unsecure primary station 412 (e.g., primary station automatically connects to any device within range).

A primary station 412 that automatically connects to any portable display 402 within range may be desirable in many instances, such as when the primary station 412 is located in a vehicle. Thus, when an additional passenger enters the vehicle with their own portable display 402, the portable display 402 begins to receive power via its power receiver, and primary station 412 may detect the portable display 402 upon receipt of a connection request received from the device. If the primary station 412 does not require a password to access, the primary station 412 may begin to transmit data to the newly detected portable display 402. Primary station 412 may transmit the same content to each portable display 402A, 402B, 402C in the vehicle. Primary station 412 may also transmit different content to each portable display 402A, 402B, 402C.

A primary station 412, in some embodiments, can be configured to synchronize or transmit (power and/or data) only with specific portable displays 402. A primary station 412 may also be configured to transmit content to portable displays 402 using encryption or other security methods in order to prevent any "unauthorized" portable display 402 within range of the primary station 412 from receiving and interpreting the data signal being transmitted from the primary station 412.

In some embodiments, the primary station 412 can include a switch or parameter, adjustable through hardware and/or software, which can determine whether one or more specific portable display(s) 402 are able to receive and decode the data signal being transmitted by the primary station 412. In some instances, each portable display 402 may receive a different data signal from the same primary station 412 in order to view different programming at the same time. In these cases, the primary station 412 encodes the data signals in such a way that that each portable display 402 receives and interprets the desired data signal, from respective selected or designated primary station 412, without interference.

A portable display 402 may receive data transmitted from a first primary station 412 while receiving power from a second, different primary station 412. There can be several variations as should be apparent, and data signal and power adjustments can be made manually, automatically or a combination thereof. For example, a user, via the portable display 402, might select to receive data signals from another primary station 412 (e.g., selects a primary station from an "available primary station" menu displayed on the device), but the portable display 402 may receive power from any primary station 412 within range of the portable display 402.

Figure 5:
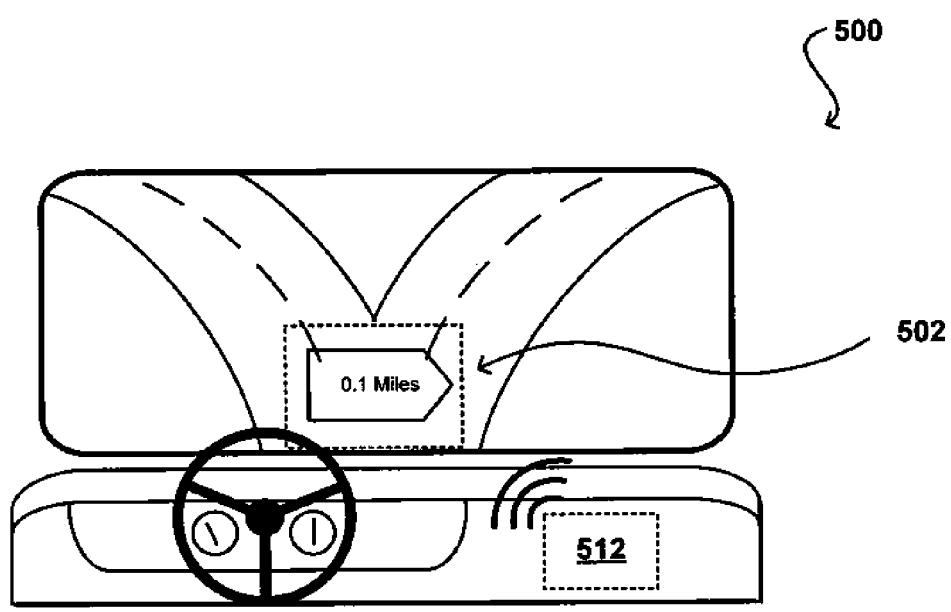
FIG. 5 illustrates a portable display in communication with a primary station.

FIG. 5 illustrates a configuration 500 of a portable display 502 and a primary station 512 located in a vehicle. In this example, portable display 502 is not contained in a housing, (rigid or flexible) and is adhered to the interior surface of a windshield using static attraction or another such approach. Portable display 502 can be transparent, or at least substantially transparent, such that a driver can see through the display portion of the portable display 502 when no content is being displayed (or at least not filling the entire screen). Portable display 502 can be positioned anywhere within the vehicle that is within range of primary station 512.

In such a configuration, information can be conveniently displayed to the user via a portable display 502 mounted within a vehicle (e.g., on the windshield). For example, if primary station 512 is in communication with a global positioning system (GPS) or similar device, driving directions and/or a map can be provided to portable display 502 and displayed such that a user can view directional information. In some embodiments, the information displayed in portable display 502 is at least partially transparent or opaque, such that no portion of the windshield is completely blocked and portable display 502 complies with local traffic laws. In other embodiments, portable display 502 may be configured to display caller ID information, the temperature outside the vehicle, traffic alerts or any other appropriate information (e.g., nearest gas station, hotel). The user may select the content to be presented and can use a single portable display 502 to present many different and selectable types of content.

The versatility of the portable display 502 may allow for many other uses. For example, a user might adhere a thin portable display 502 (e.g., portable display is simply a display) to the user's glasses, such that the user can utilize the glasses as a display screen when desired. In other embodiments, a portable display 502 or communication device can take the form of an earpiece that allows a user to hear audio information and/or provide audio input while simultaneously receiving power wirelessly from a primary station 512. An advantage to portable displays 502 over conventional displays and earpieces is that power is also provided wirelessly by a primary station 512 to the portable display 502 such that the portable display 502 operates for substantially longer periods and may not need to be recharged. Many other variations exist as well within the scope of the various embodiments.

Even though FIGS. 4-5 illustrate a remote display system located in a vehicle, it should be appreciated that a remote display system has many other applications as well. For example, a college campus might have multiple primary stations 512 located across campus. The primary stations 512 located throughout campus basically establish a wireless power and data network, such that a student, using their portable display 502, can access data anywhere on campus. At the same time, the portable display 502 constantly receives power from the network of primary stations 512 while the student is on campus. Thus, the portable display 502 may operate without requiring an independent power source (e.g., rechargeable battery). Similar to Wi-Fi services today that require a fee to access, users could be charged an access or usage fee to utilize the system including usage of the wirelessly transmitted power. As will be discussed in more detail below, a rechargeable battery may however provide additional benefits. If the data available to the student included the electronic version of the text books required by a class, a student might be able to view the electronic version of the text book while in class and may no longer need to carry multiple, heavy books around campus.

In another example, a professor may provide a video presentation during class that could be streamed live to each student in the class with a portable display 502. During the professor's lecture accompanying the presentation, a student may annotate the presentation with notes of the professor's lecture as well as the student's own notes of the presentation. By way of example only, these may be time-based annotations (e.g., 32 minutes into the presentation, the professor said "pay particular attention to this portion of the presentation for your upcoming midterm"). In some embodiments, a portable display may also allow a student to transmit their notes to another person or storage device in real-time, at periodic intervals (e.g., auto backup feature) and/or upon manually selecting to do so.

In yet another example, a professor may divide the students in the class into five workgroups, where each workgroup is presented with a different assignment. An assignment may comprise any combination of content, such as streamed multimedia, text, a prerecorded lecture, etc. The professor may configure one or more primary stations to transmit a particular assignment to each student's portable display based on their workgroup. The primary station(s) may be configured prior to the start of class if the professor predetermines which students are included in a workgroup. The primary station(s) may also be configured during class if, for example, the professor allows the students to form the workgroups at the beginning of class. Regardless of when the primary station(s) is configured, the student's portable display will receive the assignment from the primary station. Alternatively, the professor may provide each student with a workgroup password to access a particular primary station in order to receive the assignment.

Figure 6:
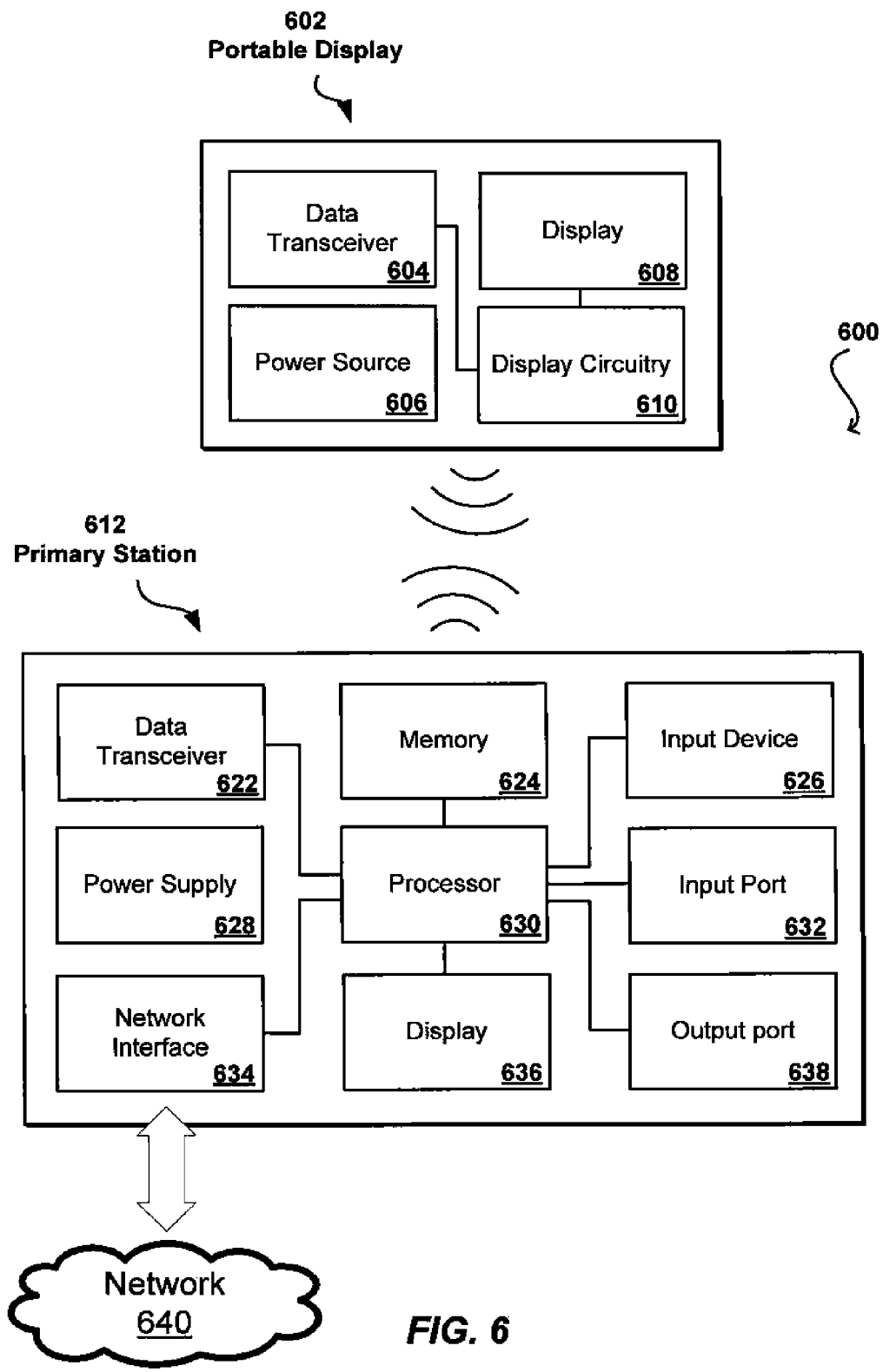
FIG. 6 is a block diagram of another embodiment of various components within a portable display and a primary station.

FIG. 6 illustrates another embodiment of a portable display 602 that includes a data transceiver 604 instead of, or in addition to, a data receiver (as shown in FIG. 3) and a power source 606. Data transceiver 604 allows for two-way wireless communication with primary station 612 via data transceiver 622. In some embodiments, power source 606 located in portable display 602 is a rechargeable battery. In other embodiments, power source 606 is a power receiver similar to power receiver 306 shown in FIG. 3. Portable display 602 also includes display 608 and display circuitry 610. In an embodiment of a portable display that includes a rechargeable battery, the power transmitted by a primary station may also be used to recharge the battery contained in the portable display. To minimize power costs associated with charging a battery in a portable display, in some embodiments, a primary station may be configured to transmit power to an otherwise powered-down portable display for battery recharging purposes during low power demand times (e.g., at night when the cost of electricity is lower, during low demand times).

Portable display 602 may be configured to receive pre-rendered pages (e.g., bitmap images including page content) or other renderings of content and provide the rendered pages for display via the display screen 608. Portable display 602 may also include a processor and associated circuitry such that the portable display 602 is able to render content.

FIG. 6 further illustrates that a primary station 612 may be connected to a network 640 (e.g., Internet, local area network (LAN)) via a network interface 634. For example, primary station 612 is connected to a LAN that is also connected to other primary stations. A portable display may receive any content that is stored on any of the primary stations in the LAN via the primary station 612 the device is currently connected to. For example, in FIG. 6, primary station 612 may transmit content to portable display 602 that is stored on another primary station in the LAN or a local storage device (e.g., hard drive) that is also connected to the LAN. In some embodiments, primary station 612 may not store any content, and memory 624 is used for caching content retrieved from the local storage device.

A primary station 612 may also transmit content retrieved from a wide-area network, such as the cloud, to a portable display 602. For example, if the portable display 602 is an electronic book reader, and the user has their purchased books stored in the cloud, a primary station 612 may send a request to the content provider associated with a particular electronic book to retrieve all or a portion of the electronic book via network interface 634. In some embodiments, the primary station 612 retrieves the content and stores the content locally, such as on a hard disk or other such device, and the content is provided to the portable display entirely from the primary station 612. In other embodiments, the primary station 612 streams the content to the portable display 602.

Network interface 634 may wirelessly communicate with the LAN, WAN, cloud, etc. or be hardwired to a network access device (e.g., laptop computer, desktop computer, cellular phone, smart phone). Primary station 612 shown in FIG. 6 may include similar components as primary station 112 shown in FIG. 3, which therefore do not need to be described again.

Figure 7:
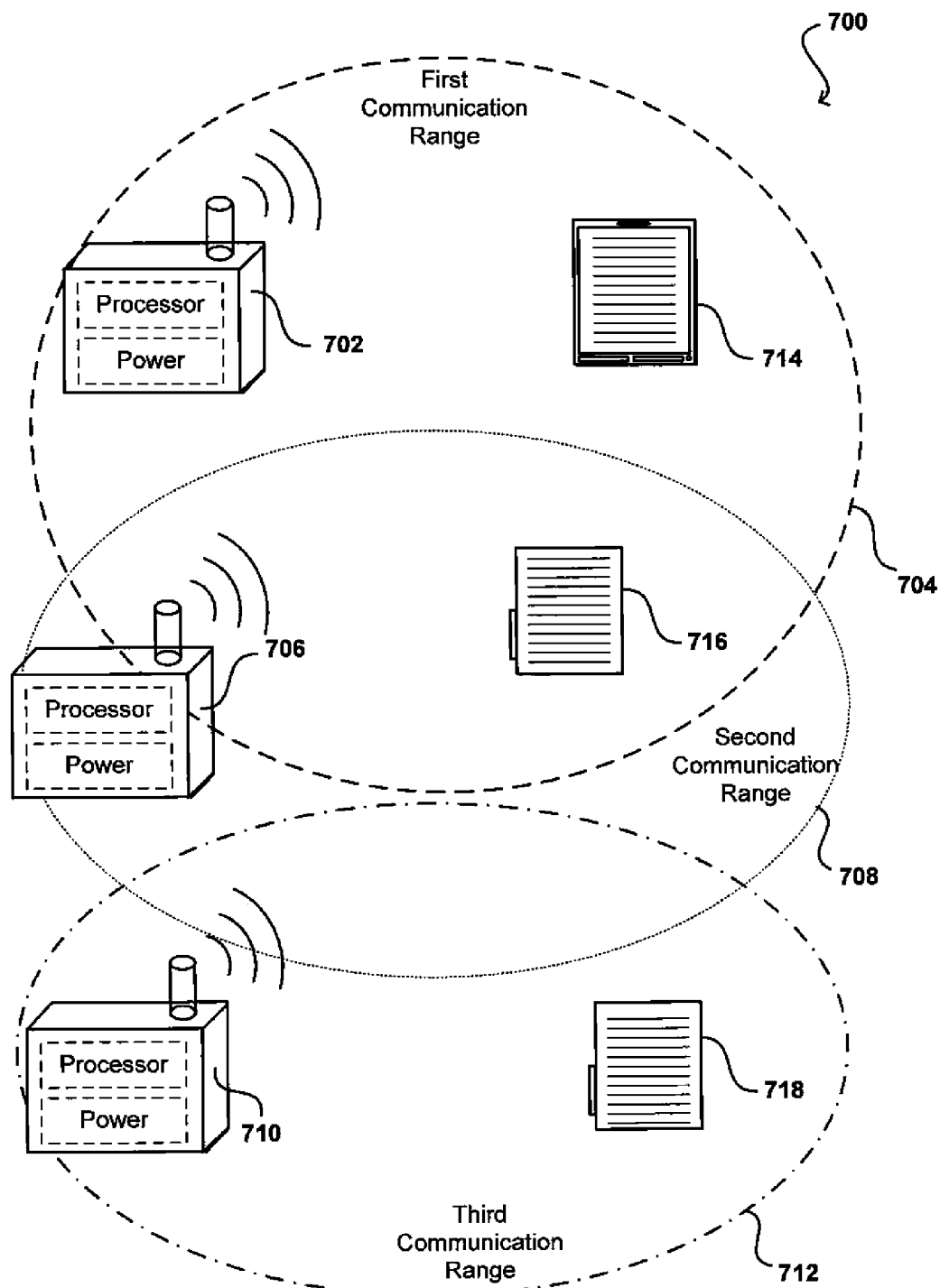
FIG. 7 illustrates one or more portable displays connecting to multiple primary stations.

FIG. 7 illustrates a primary station network 700 that includes multiple primary stations 702, 706, 710, each with an associated communication range. A communication range may refer to an area surrounding a primary station that a portable display must be within in order for the portable display to receive content, power or both from the primary station. In this example, primary station 702 is able to transmit content and/or power to a portable display 714 within a first range of communication 704, primary station 706 is able to transmit content and/or power to a portable display 716 within a second range of communication 708 and primary station 710 is able to transmit content and/or power to a portable display 718 located within a third range of communication 712. FIG. 7 also shows three portable displays 714, 716, 718, which may correspond to a single portable display moving between all three communication ranges 704, 708, 712 or may correspond to a different portable display in each of the three different communication ranges 704, 708, 712.

In the instance where a user is holding a portable display and travelling through the communication ranges 704, 708, 712, system 700 may coordinate power transmission between the three primary stations 702, 706, 710. For example, all three primary stations 702, 706, 710 do not necessarily radiate power at the same time or all the time. In some embodiments, each primary station includes a detection element that may operate to detect whether a person and/or a portable display is present within the primary station's communication range or located within a room where the primary station is located. In this case, a primary station may operate in a power-saving state (e.g., does not transmit power) while no person and/or portable display is detected. On the other hand, when a detection element detects the presence of a person and/or a portable display, the primary station may begin to transmit or radiate power such that any portable display within the communication range begins to receive power transmitted by the primary station. Similarly, when a person is no longer detected by the detection element (e.g., person leaves a room), the primary station will again return to a power-saving state. In various embodiments, the detection element may include one or more of an imaging element (e.g., a camera), an audio element (e.g., circuitry for audio/voice recognition), a motion detection element (e.g., infrared or ultrasound circuitry for motion detection) and an identification element (e.g., circuitry utilizing information to identify a user and/or a portable display by visual, RFID, signature analysis or any other known methods).

In FIG. 7, the first portable display 714 is shown to be within the first communication range 704 of station 702. In some embodiments, as discussed above, the portable display 714 may receive power from primary station 702 when the device initially enters first communication range 704 and can automatically generate and transmit a connection request to primary station 702. In other embodiments, a confirmation message may be generated and transmitted by primary station 702 in response to the connection request such that the user must approve the connection between portable display 714 and primary station 702 before the connection is established.

A second portable display 716 is shown to be within both the first communication range 704 of primary station 702 and a second communication range 708 of primary station 706. The connectivity between a primary station and a portable display can be managed in a number of different ways. For example, the portable display 716 might be configured to communicate only with a specific primary station or use a specific communication protocol, which can determine which primary station the portable display will receive content from. As discussed above, portable display 716 may wirelessly receive power from any primary station. In other embodiments, a user might have registered the portable display with only primary stations 702 or 706, such that primary stations 702, 706 may each attempt to communicate with portable display 716, but only the primary station having the corresponding registration information will actually connect with portable display 716.

The connection can also be controlled, to some extent, by the existing connection on the portable display 716. For example, portable display 716 might initially be located within first communication range 704 and receives content from primary station 702. When portable display 716 moves within second communication range 708 of primary station 706, portable display 716 might maintain the connection (both for content and power) with primary station 702 until the portable display 716 is completely outside of first communication range 704, at which point, the portable display 716 may attempt to connect to primary station 706. The connection may also be dictated, at least in part, by the strength of the relative signal transmitted by a primary station. For example, portable display 716, as shown in FIG. 7, is located within the communication range of both stations 702 and 706. In some embodiments, the portable display 716 may attempt to connect with a primary station that currently has the strongest signal with respect to portable display 716. In order to prevent constant switching when signals transmitted from two different primary stations are similar in strength, a portable display 716 may connect to a different primary station only when, for example, the difference in signal strengths exceeds a threshold or when the signal strength from a primary station drops below a minimum threshold.

A third portable display 718 is shown to be within the third communication range 712 of primary station 710. Portable display 718 may receive power from primary station 710 when the display initially enters third communication range 712 and can automatically generate and transmit a connection request to primary station 710. In other embodiments, a confirmation message may be generated and transmitted by primary station 710 in response to the connection request such that the user must approve the connection between portable display 718 and primary station 710 before the connection is established.

Figure 8:
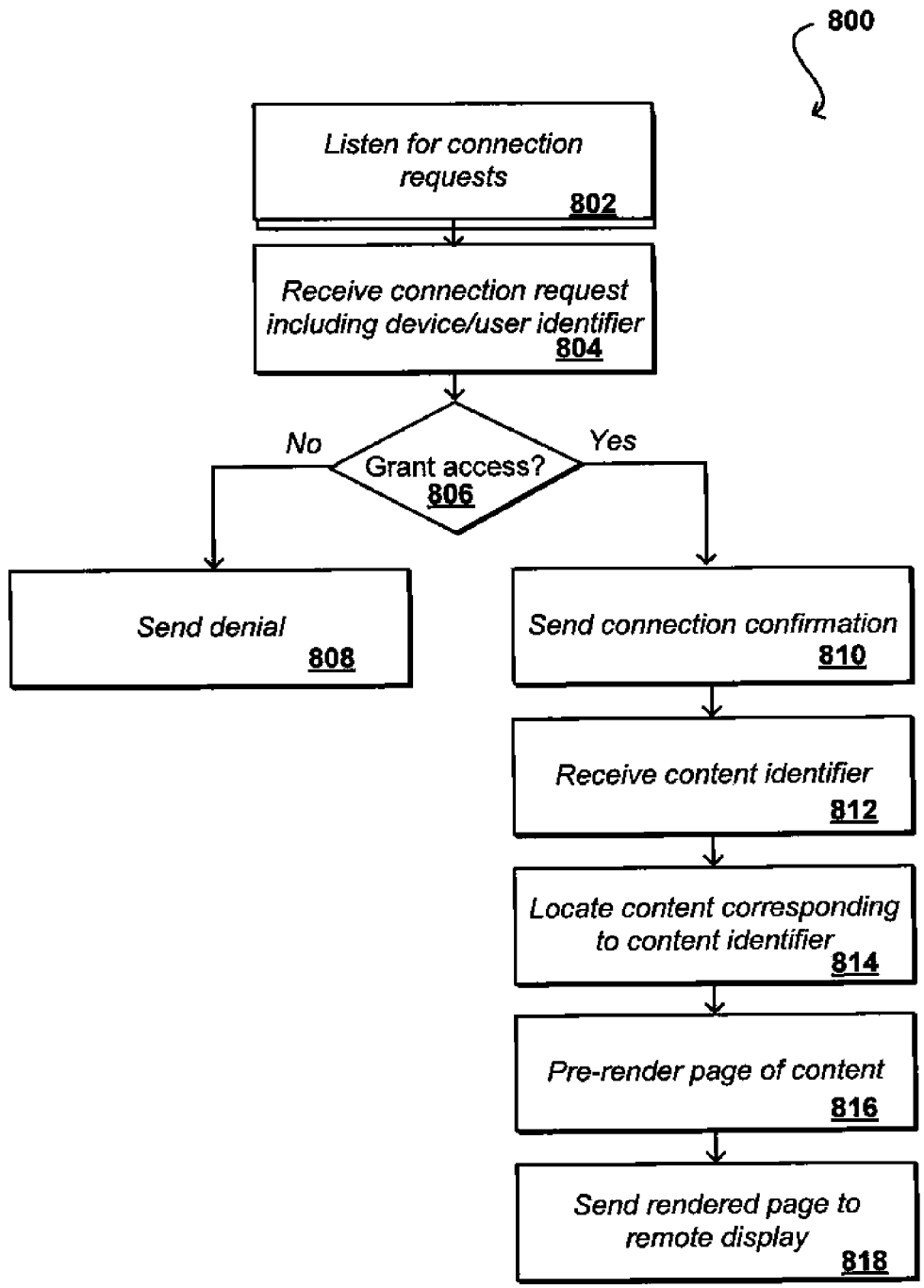
FIG. 8 is a flow chart illustrating steps of a primary station providing content to a portable display.

FIG. 8 illustrates a method 800 of transmitting pre-rendered content from a primary station to a portable display. It should be understood that the steps shown in FIG. 8 are merely examples, and that additional, fewer or alternative steps can be used in similar or alternate orders, or in parallel, within the scope of other embodiments. In this example process, a device such as a primary station detects/listens for connection requests from a portable display 802. For example, a BLUETOOTH enabled primary station might listen for a BLUETOOTH enabled portable display to come within a transmission range of the primary station. It should be understood, however, that in other embodiments, a portable display could send heartbeat or similar connection signals, and the primary station can listen for the presence of such signals. In other embodiments, a user might manually request or initiate a connection between a primary station and a portable display.

When a portable display comes within the communication range of the primary station and issues a connection request, the request can be received by the primary station 804. The primary station can determine whether to grant the portable display access 806 to, or otherwise establish a connection with, the requesting portable display. For example, in some embodiments, a primary station might establish a connection with any compatible portable display or only establish a connection to portable displays that are registered with the primary station. Similarly, a connection might only be established when a user of the portable display is identified through the connection request and that user is authorized to connect with the primary station. Various other such processes can be used as should be apparent to one with skill in the art.

If the primary station determines that a connection should not be established (e.g., unauthorized device), a denial of request message can be sent to the requesting portable display 808. Although in some embodiments the primary station may instead choose to not respond to the requesting device. If the primary station allows the portable display to connect to the primary station, a message or other communication can be sent to the requesting device to establish the connection 810. It should be understood that any appropriate connection protocols and communications can be used as is known in the art for such purposes. Once a connection is established, a request can be received from the portable display that includes a content identifier 812, such as an invariant number, that identifies a location, portion, page or other set or subset of content to be displayed on the portable display. For example, for an electronic book reader, the content identifier could correspond to the current page of an electronic book to be displayed to the user.

Once the identifier is extracted, pending any verification or other such processes, the content corresponding to the identifier can be retrieved 814. As discussed above, the content corresponding to the identifier may be located in a local storage device accessible by the primary station (e.g., via a LAN), a storage device within the primary station itself (e.g., hard drive) or stored in a WAN, such as the cloud, that is accessible by the primary station. In the present example, once the content is located, the content is pre-rendered 816 and transmitted to the portable display for display to the user 818. The content may be pre-rendered by the primary station or any other device capable of pre-rendering content that is accessible by the primary station.

The primary station can determine the amount of the content that can (or should) be displayed on the portable display in a given instance and can pre-render the appropriate amount of content to send to the device. For example, the content identifier received at 812 might correspond to a chapter of a book. Even though the primary station may locate the chapter of the book at 814, the primary station might pre-render only a first page of the chapter at 816 depending on aspects of the device, user preferences or other such information. As discussed above, the portable display may be configured to render content received from the primary station. In this instance, the primary station does not pre-render the content in block 816 and instead delivers the content to the device 818.

Figure 9:
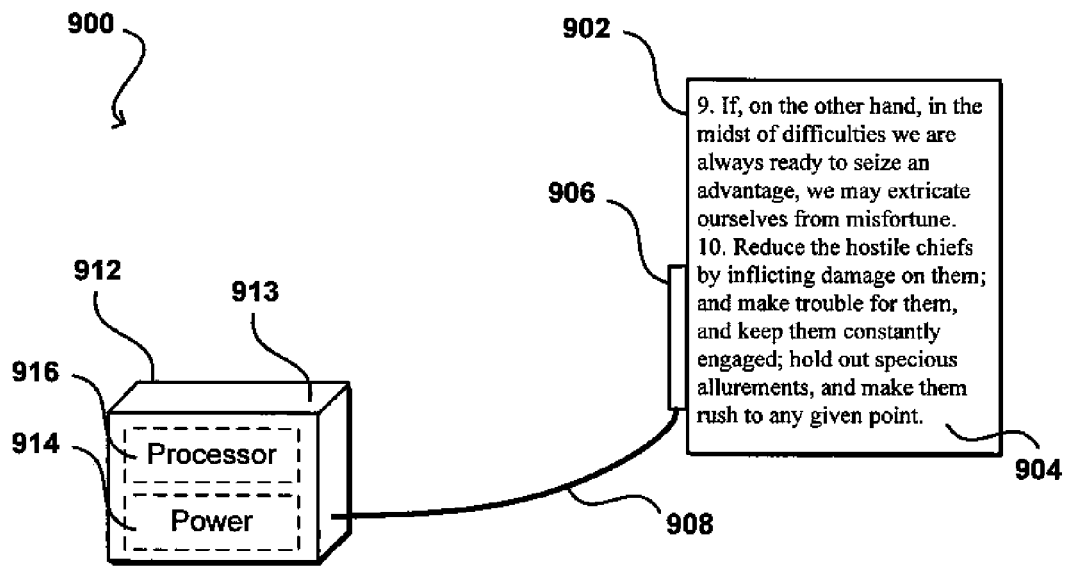
FIG. 9 illustrates an embodiment of a portable display connected to a primary station using a transmission cable.

In some instances it may be desirable to connect a portable display to a primary station using a transmission cable. For example, a portable display may be located in an area whereby it is difficult to receive a data signal wirelessly from a primary station. FIG. 9 illustrates a remote display system 900 where portable display 902 may be physically connected to primary station 912 by a transmission cable 908. In this instance, primary station 912 may be stationary but the transmission cable 908 allows a user to move freely around while using the portable display 902. In FIG. 9, portable display 902 includes display 904 and housing 906, and portable display 902 is coupled to primary station 912 utilizing transmission cable 908. Housing 906 may include one or more of the components 304, 306, 310 shown in FIG. 3. Housing 906 may include other components as well. Similar to primary station 112 shown in FIG. 1, primary station 912 shown in FIG. 9 includes power supply 914 and processor 916.

Transmission cable 908 can include one or more signal paths (e.g., wires) for transmitting data and power from primary station 912 to portable display 902. Transmission cable 908 may transmit power, data or both from the primary station 912 to the portable display 902. If, for example, the transmission cable 908 transmits only power to the portable display 902, the primary station 912 may wirelessly transmit the data to the portable display 902. If the portable display 902 is able to transmit data back to the primary station 912, the transmission cable 908 may also transmit the data from the portable display 902 to the primary station 912. Transmission cable 908 may be shielded, insulated or otherwise covered as necessary or desired. By way of example only, a transmission cable 908 may include a fiber optic cable, a conventional two-wire power cable or any other type of data or power cable known within the art.

FIG. 9 illustrates that the transmission cable 908 extends between housing 906 of portable display 902 and primary station 912. As will be discussed in more detail below, the length or amount of transmission cable 908 between a primary station and a portable display may be actively managed based on a tension level of the cable 908. In some embodiments, the transmission cable 908 retracts into and extends out of the primary station 912, which has a cable management system that actively manages the amount of transmission cable 908 between the primary station 912 and portable display 902.

Figure 10:
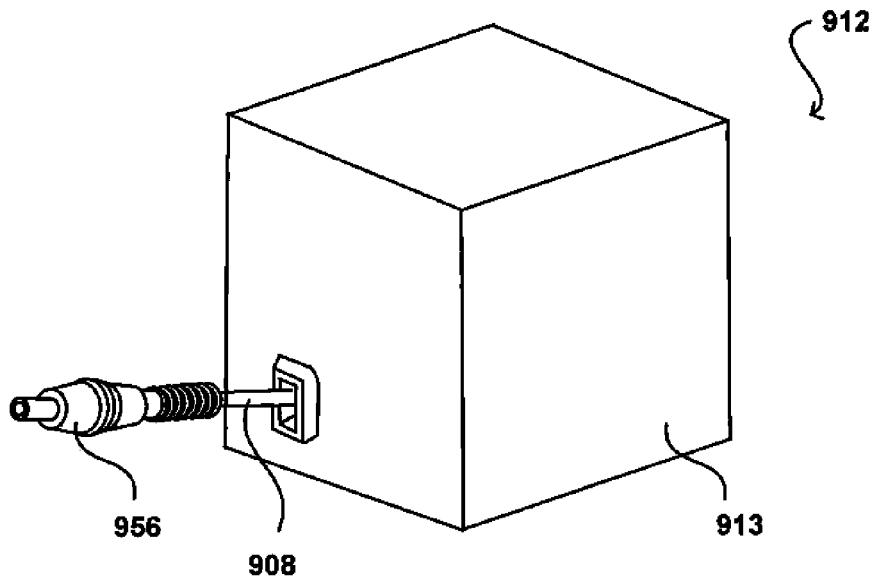
FIG. 10 is an isometric drawing of an embodiment of the primary station shown in FIG. 9 having a retractable transmission cable.

FIG. 10 illustrates one embodiment of primary station 912 shown in FIG. 9 that includes a retractable transmission cable 908. The transmission cable 908 may retract into the housing 913 of the primary station 912 such that, when the primary station 912 is not connected to a portable display 902 using the transmission cable 908, the amount of transmission cable 908 extended out of the primary station 912 is minimal. A primary station 912 with a retractable transmission cable 908 also allows a user, holding a portable display 902 connected to the primary station 912 via the transmission cable 908, to move away from the primary station 912 yet remain connected to the primary station 912.

FIG. 10 illustrates that the transmission cable 908 includes a connector 956. The connector 956 shown in FIG. 10 is for illustration purposes only, and is not intended to limit the scope of the technology described herein. Any connector known in the art that may transmit a data and/or power signal may be used. In some embodiments, the transmission cable 908 may be connected to portable display 902 by a breakaway connection such that when the transmission cable 908 is pulled with sufficient force, the transmission cable 908 will disconnect from portable display 902 in order to prevent potential injury or damage to the portable display 902 and/or the transmission cable 908. Any appropriate breakaway connection can be used as known or subsequently developed for such purposes.

Figure 11:
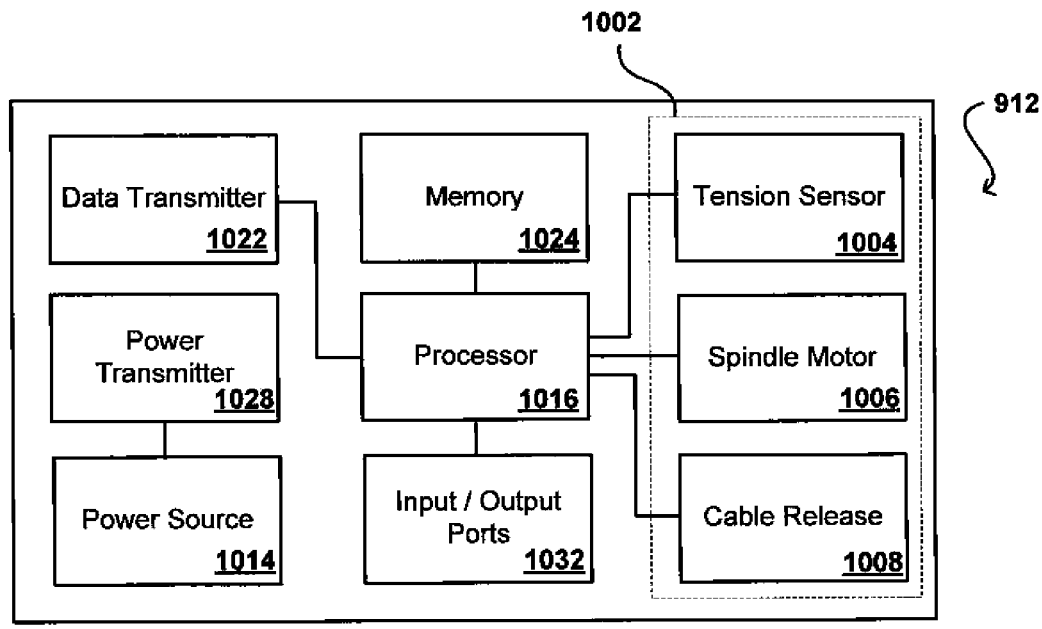
FIG. 11 is a block diagram of the primary station shown in FIG. 10.

FIG. 11 is a block diagram of primary station 912 shown in FIG. 10 that includes a power source 1014, a processor 1016, a data transmitter 1022, a memory 1024, a power transmitter 1028 and input/output ports 1032. These components are similar to the components described in detail above in FIG. 3. In addition to these components, primary station 912 includes a cable management system 1002, which includes, by way of example only, a tension sensor 1004, a spindle motor 1006 and a cable release 1008. The cable management system 1002 actively manages the amount of transmission cable 908 located between the primary station 912 and portable display 902. Primary station 912 may include additional, alternative or fewer components than shown in FIG. 11, in similar or alternate configurations as should be apparent to one of ordinary skill in the art in light of the teachings and suggestions contained herein.

Tension sensor 1004 detects an amount of tension on the transmission cable, as a result of user action, gravity or any other such source. Various other sensors can be used as discussed elsewhere herein. The tension sensor 1004 in this embodiment is in communication with processor 1016, which can utilize the information provided by tension sensor 1004 to determine the tension on the transmission cable at appropriate intervals, appropriate times or continuously. Based on the information received from the tension sensor 1004, processor 1016 can send a control signal to spindle motor 1006 to extend or retract the transmission cable. In some embodiments, the cable management system 1002 has a dedicated processor and does not utilize processor 1016.

Cable management system 1002 determines a tension level on the cable and maintains the tension level within a selected and/or predefined upper tension threshold and a lower tension threshold. Based on the tension level on the cable, cable management system 1002 determines whether to activate spindle motor 1006 to retract transmission cable (e.g., into the primary station) or to activate cable release 1008 to allow an additional amount of transmission cable to be released (e.g., out of the primary station) based on a lower threshold tension level and an upper threshold tension level, respectively.

For example, when a user holding a portable display connected to a primary station pulls the portable display away from the primary station, the tension sensor 1004 in the cable management system 1002 detects an increased tension on the transmission cable. When the tension level exceeds an upper threshold tension level, the cable management system 1002 activates the cable release 1008 to allow an additional amount of transmission cable 908 to extend out of the primary station 912 until at least the tension level in the cable drops below the high threshold tension level. By activating the cable release 1008, the portable display does not tug on the transmission cable and possibly disconnect the transmission cable from the portable display.

Similarly, when the user moves the portable display 902 closer towards the primary station 912, cable management system 1002 detects that the tension level on the cable drops, and when the tension level drops below a lower threshold tension level, the cable management system 1002 activates the spindle motor 1006 to retract the transmission cable back into the primary station 912 until the tension level at least exceeds the lower threshold tension level.

Figure 12:
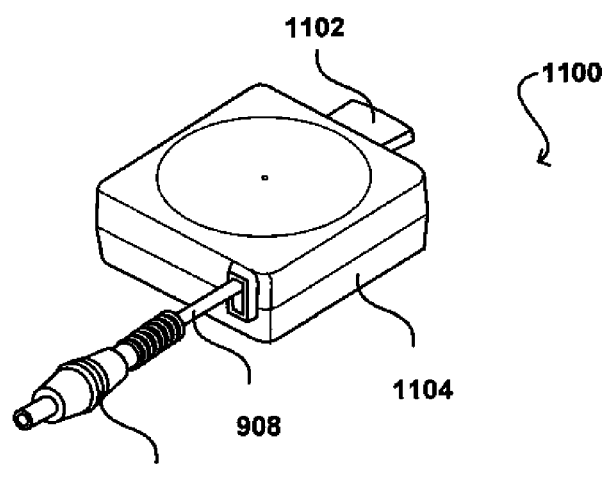
FIG. 12 is an isometric drawing of an embodiment of a cable reel having a cable management system.

FIG. 12 illustrates that the transmission cable 908 and cable management system 1002 may be located in a cable reel 1100 instead of a primary station. FIG. 12 shows that the cable reel 1100 includes a connector 1102 extending from a rear surface (not visible in FIG. 12) of the cable reel housing 1104. The connector 1102 allows the cable reel 1100 to connect to a primary station. The transmission cable 908 may retract into (and extend out of) housing 1104 of cable reel 1100. Transmission cable 908 includes a connector 956 for connecting to a portable display. Connector 1102 of cable reel 1100 and connector 956 of transmission cable 908 may be any type of connector such as, by way of example only, a universal serial bus (USB) connector or any other connector that may transmit a data signal and/or a power signal between a primary station and a portable display using the transmission cable 908.

In the FIG. 12 embodiment, cable reel 1100 may include a cable management system 1002 similar to the system discussed above with regard to FIG. 11. For example, cable reel 1100 may include within its housing 1104 a stress/tension sensor, a spindle motor and/or a cable release similar to those shown in FIG. 11. In some embodiments, cable reel 1100 further includes a processor and a power supply to operate the cable management system 1002. In other embodiments, cable reel 1100 does not include a processor or a power supply and instead uses the processor and power supply in the primary station to operate the cable management system 1002.

Even though the technology disclosed herein refers to a portable display for presenting content in a display, the term "portable display" is not limited to a portable device that presents only images, text or video content. A portable display may refer to any portable device that presents video, an image, audio, text and the like. The term "data," as used herein, may refer to any data signal transmitted to a portable display. Data transmitted to a portable display may comprise a control signal and/or content. Types of content that may be transmitted from a primary station to a portable display may include video, audio, text or any other type of audio/image data known in the art.

The specification and drawings are, accordingly, to be regarded in an illustrative sense rather than a restrictive sense. It will, however, be evident that various modifications and changes may be made thereunto without departing from the broader spirit and scope of the invention as set forth in the claims.

What is claimed is:

1. A remote display system, comprising:
   a primary station including a data transmitting element and a power transmitting element; and
   a portable display, physically remote from and without a tangible connection with the primary station, the portable display including:
      a user input element;
      a power source configured to recharge in response to the portable display being located within a power transmitting range of the primary station, wherein the power source is configured to power the portable display in response to the portable display being located outside of the power transmitting range of the primary station;
      a power receiving element operable to wirelessly receive power from the power transmitting element; and
      a data receiving element operable to receive data from the data transmitting element,
   wherein the portable display is configured to operate in stand-by mode until the portable display enters the power transmitting range of the primary station,
   wherein, in response to the portable display initially entering the power transmitting range of the primary station, the portable display switches to a normal operating mode,
   wherein, while in the normal operating mode and in response to receiving a request from the portable display for the data, the request including a content identifier, the portable display is configured to display the data received from the primary station, the data corresponding to the content identifier, the content identifier identifying a subset of content corresponding to the data for display on the portable display, and
   wherein the data is presented by at least partially using the power received from the power transmitting element of the primary station.

2. The remote display system of claim 1, wherein the primary station further includes a second power source configured to supply power to the power transmitting element.

3. The remote display system of claim 2, wherein the power source is a battery.

4. The remote display system of claim 1, further comprising:
   a second portable display, physically remote from and without a tangible connection with the primary station, the second portable display including:
   a second power receiving element operable to wirelessly receive power from the power transmitting element of the primary station; and
   a second data receiving element operable to receive second data from the data transmitting element of the primary station,
   wherein the second portable display is operable to present the second data received from the data transmitting element of the primary station.

5. The remote display system of claim 4, wherein the second data received by the second data receiving element of the second portable display is different than the data received by the data receiving element of the portable display.

6. The remote display system of claim 1, further comprising a detection element operable to detect a presence of a user.

7. The remote display system of claim 6, wherein the power transmitting element does not transmit power when the user is not present.

8. The remote display system of claim 6, wherein the detection element is operable to capture an image for identifying the user.

9. The remote display system of claim 8, wherein the displayed data is based at least in part on the identified user.

10. A remote display system, comprising:
    a primary station including a power transmitting element and a data transmitting element;
    a portable display including a power receiving element and a data receiving element, wherein the portable display is configured to receive power from at least one of wirelessly through the power transmitting element or through the transmission cable, wherein the portable display is configured to receive data from at least one of wirelessly through the data transmitting element or through a transmission cable in response to receiving a request from the portable display for data, the request including a content identifier, wherein the portable display is operable to present data received by the data receiving element, the data corresponding to the content identifier, the content identifier identifying a subset of content corresponding to the data to be presented on the portable display, wherein the portable display includes a power source configured to recharge in response to the portable display being within a power transmitting range of the primary station, and wherein the power source is configured to power the portable display in response to the portable display being outside of the power transmitting range of the primary station, wherein the portable display is configured to operate in a stand-by mode until the portable display enters the power transmitting range of the primary station; and wherein in response to the portable display initially entering the power transmitting range of the primary station, the portable display switches to a normal operating mode; and
    the transmission cable connecting the primary station and the portable display, the transmission cable configured to supply both (a) power from the power transmitting element of the primary station to the power receiving element of the portable display and (b) the data from the data transmitting element of the primary station to the data receiving element of the portable display, the data presented on the portable display,
    wherein the primary station further includes:
    transmission cable management circuitry including at least one processor operable to determine a tension on the transmission cable based at least in part on data obtained by at least one tension sensor, the transmission cable management circuitry further operable to determine whether the tension on the transmission cable exceeds an upper threshold tension level or a lower threshold tension level; and an adjusting element operable to compensate for physical movement of the portable display or the primary station by adjusting an amount of the transmission cable displaced between the primary station and the portable display so that the tension is maintained between the upper threshold tension level and the lower threshold tension level.

11. The remote display system of claim 10, wherein the portable display further includes a data receiving element.

12. The remote display system of claim 11, wherein the data receiving element of the portable display is configured to receive pre-rendered content from the primary station.

13. The remote display system of claim 12, wherein data is received by the portable display from the data transmitting element of the primary station using at least one of a wired connection and a wireless connection.

14. The remote display system of claim 10, wherein the transmission cable includes a breakaway connection capable of disconnecting the transmission cable from at least one of the primary station and the portable display upon the tension exceeding a breakaway threshold tension level.

15. A primary station operable to communicate with a portable display, comprising:
  a processor;
  a memory for storing instructions to be executed by the processor;
  a power source; and
  signal transmitting circuitry configured to wirelessly transmit power from the power source to signal receiving circuitry of the portable display the portable display being physically remote from and without a tangible connection with the primary station, the signal transmitting circuitry further configured to wirelessly transmit data to the portable display,
  wherein the portable display is configured to operate in stand-by mode until the portable display enters a power transmitting range of the primary station,
  wherein, in response to the portable display initially entering the power transmitting range of the primary station, the portable display switches to a normal operating mode,
  wherein, while in the normal operating mode and in response to receiving a request from the portable display for data, the request including a content identifier, the portable display is configured to display the data received from the primary station, the data corresponding to the content identifier, the content identifier identifying a subset of content corresponding to the data for display on the portable display,
  and wherein the power source is configured to recharge in response to the portable display being within the power transmitting range of the primary station, wherein the power source is configured to power the portable display in response to the portable display being outside of the power transmitting range of the primary station.

16. The primary station of claim 15, wherein the signal transmitting circuitry includes a power transmitting element and a data transmitting element.

17. The primary station of claim 15, wherein the primary station further includes a network interface configured to receive data from a network.

18. The primary station of claim 15, wherein the data transmitted to the portable display is pre-rendered content for presentation on the portable display.

19. The primary station of claim 15, wherein the signal transmitting circuitry is operable to transmit at least one of the power and the data to the signal receiving circuitry of the portable display using a transmission cable.

20. The primary station of claim 19, wherein the primary station further includes:
  transmission cable management circuitry operable to determine whether a tension on the transmission cable exceeds an upper threshold tension level or a lower threshold tension level; and
  an adjusting element operable to adjust an amount of the transmission cable displaced between the primary station and the portable display so that the tension is maintained between the upper threshold tension level and the lower threshold tension level.

21. The primary station of claim 15, further comprising a detection element operable to detect a presence of at least one of a user and the portable display.

22. The primary station of claim 21, wherein the signal transmitting circuitry does not transmit power when the user is not present.

23. The primary station of claim 21, wherein the detection element is operable to capture an image for identifying a user.

24. The primary station of claim 23, wherein the data transmitted to the portable display is based at least in part on the identified user.

25. A portable display for use with a primary station, comprising:
  signal receiving circuitry operable to wirelessly receive power and data from signal transmitting circuitry of the primary station in response to detecting that the portable display is present within a power transmitting range of the primary station, the primary station being physically remote from and without a tangible connection with the portable display; and
  circuitry configured to operate in stand-by mode until the portable display enters a power transmitting range of the primary station,
  wherein, in response to the portable display initially entering the power transmitting range of the primary station, the portable display switches to a normal operating mode, wherein, while in the normal operating mode, the portable display is configured to display the data received from the primary station,
  wherein, in response to receiving a request from the portable display for data, the request including a content identifier, the portable display is configured to convey data received by the signal receiving circuitry, the data corresponding to the content identifier, the content identifier identifying a subset of content corresponding to the data to be conveyed by the portable display, and
  wherein the portable display includes a power source configured to recharge in response to the portable display being within the power transmitting range of the primary station, and wherein the power source is configured to power the portable display in response to the portable display being outside of the power transmitting range of the primary station.

26. The portable display of claim 25, wherein the signal receiving circuitry comprises power receiving circuitry and data receiving circuitry.

27. The portable display of claim 26, wherein the signal transmitting circuitry of the primary station comprises power transmitting circuitry and data transmitting circuitry, the power receiving circuitry of the portable display operable to receive the power transmitted by the power transmitting circuitry of the primary station, the data receiving circuitry of the portable display operable to receive the data transmitted by the data transmitting circuitry of the primary station.

28. The portable display of claim 25, further comprising:
signal transmitting circuitry operable to communicate with the primary station.

29. The portable display of claim 28, further comprising:
a touch-responsive input configured to receive user input.

30. The portable display of claim 29, wherein the signal transmitting circuitry is operable to transmit the user input to the primary station.

31. The portable display of claim 25, further comprising a detection element operable to capture an image for identifying a user.

32. The portable display of claim 31, wherein the conveyed data is based at least in part on the identified user.

33. A computer-implemented method, comprising:
transmitting power to power receiving circuitry of a portable display via a wireless connection established between the portable display and a primary station in response to a detection that the portable display is present within a power transmitting range of the primary station, the primary station being physically remote from and without a tangible connection with the portable display; and
transmitting data to the portable display via a data transmitting element of the primary station in response to the detection that the portable display is present within the power transmitting range of the primary station,
wherein the portable display is configured to operate in stand-by mode until the portable display enters a power transmitting range of the primary station,
wherein, in response to the portable display initially entering the power transmitting range of the primary station, the portable display switches to a normal operating mode,
wherein, in response to receiving a request from the portable display for data, the request including a content identifier, the portable display is configured to display the data received from the primary station while in the normal operating mode, the data corresponding to the content identifier, the content identifier identifying a subset of content corresponding to the data for display on the portable display, and
wherein the portable display includes a power source that is configured to recharge in response to the portable display being within the power transmitting range of the primary station, wherein the power source is configured to power the portable display in response to the portable display being outside of the power transmitting range of the primary station.

34. The computer-implemented method of claim 33, wherein the data transmitted to the portable display is based on a user input received from the portable display.

35. The computer-implemented method of claim 33, where transmitting the data comprises:
retrieving the data from a network;
storing the retrieved data in a memory of the primary station; and
transmitting at least a portion of the retrieved data to a data receiving element of the portable display using the data transmitting element of the primary station.

36. The computer-implemented method of claim 33, wherein transmitting the data comprises:
pre-rendering the data; and
transmitting the pre-rendered data to a data receiving element of the portable display.

37. A cable management system, comprising:
a transmission cable configured to extend between a first device and a second device, wherein the second device is configured to receive power from at least one of wirelessly through the first device or through the transmission cable, wherein the second device is configured to receive data from at least one of wirelessly through the first device or through the transmission cable in response to receiving a request from the first device for data, the request including a content identifier, and wherein the second device is configured to display the data received, the data corresponding to the content identifier, the content identifier identifying a subset of content corresponding to the data for display by the second device, wherein the second device includes a power source that is configured to recharge in response to the second device being within a power transmitting range of the first device, wherein the power source is configured to power the second device in response to the second device being outside of the power transmitting range of the first device, wherein the second device is configured to operate in a standby mode until the second device enters the power transmitting range of the first device, and wherein, in response to the second device initially entering the power transmitting range of the first device, the second device switches to a normal operating mode;
transmission cable management circuitry including at least one electronic circuit operable to determine a tension on the transmission cable based at least in part on data obtained by at least one tension sensor,
wherein the transmission cable management circuitry is further operable to determine whether the tension on the transmission cable extending between the first device and the second device exceeds an upper threshold tension level or a lower threshold tension level; and
an adjusting element operable to adjust an amount of the transmission cable displaced between the first device and the second device to compensate for physical movement of at least one of: the first device or the second device, so that the tension is maintained between the upper threshold tension level and the lower threshold tension level.

38. The remote display system of claim 1, wherein the portable display operates in the stand-by mode until the portable display is present within the power transmitting range of the primary station, and wherein the portable display begins to operate in the normal operating mode in response to being present within the power transmitting range, and wherein the portable display presents the data received from the data transmitting element when operating in normal operating mode.

39. The primary station of claim 16, wherein the portable display operates in the stand-by mode until a detection that the portable display is present within the power transmitting range of the primary station, and wherein the portable display begins to operate in the normal operating mode in response to being present within the power transmitting range, and wherein the portable display presents the data received from the data transmitting element when operating in normal operating mode.

40. The cable management system of claim 37, wherein the at least one electronic circuit is a processor.

41. The remote display system of claim 1, further comprising:
   a second primary station associated with a second power transmitting range, wherein the portable display is configured to enter the second power transmitting range of the second primary station and transmit a connection request to the second primary station, wherein the second primary station is configured to establish a connection with the portable display in response to the connection request and begin to supply the power and the data wirelessly to the portable display upon establishing the connection.

* * * * *